US009498697B2

United States Patent
Huhtela et al.

(10) Patent No.: US 9,498,697 B2
(45) Date of Patent: Nov. 22, 2016

(54) SYSTEM FOR COMPUTING PERSONAL PLAYING TIME IN A TEAM SPORT

(75) Inventors: Jarkko Huhtela, Oulu (FI); Antti-Pekka Tauriainen, Oulu (FI); Joni Poikelin, Oulu (FI)

(73) Assignee: KURU DIGITAL CREATIONS OY, Oulu (FI)

( * ) Notice: Subject to any disclaimer, the term of this patent is extended or adjusted under 35 U.S.C. 154(b) by 147 days.

(21) Appl. No.: 14/128,969

(22) PCT Filed: Jun. 27, 2012

(86) PCT No.: PCT/FI2012/050670
§ 371 (c)(1),
(2), (4) Date: Apr. 2, 2014

(87) PCT Pub. No.: WO2013/004900
PCT Pub. Date: Jan. 10, 2013

(65) Prior Publication Data
US 2014/0222175 A1     Aug. 7, 2014

(30) Foreign Application Priority Data
Jul. 1, 2011    (FI) .................................... 20115707

(51) Int. Cl.
*A63F 9/24*     (2006.01)
*A63B 71/06*    (2006.01)
(Continued)

(52) U.S. Cl.
CPC ....... *A63B 71/0686* (2013.01); *G06Q 10/0639* (2013.01); *G07C 1/28* (2013.01); *H04W 4/008* (2013.01)

(58) Field of Classification Search
CPC . A63B 1/0622; A63B 71/06; A63B 71/0686
See application file for complete search history.

(56) References Cited

U.S. PATENT DOCUMENTS 6,707,487 B1 *  3/2004  Aman ................ A63B 24/0003
                                          348/169
7,327,251 B2 *  2/2008  Corbett, Jr. ........ G08B 21/0261
                                          340/5.2
(Continued)

FOREIGN PATENT DOCUMENTS

WO      2010065886 A1      6/2010
WO      2011106331 A1      9/2011

OTHER PUBLICATIONS

International Search Report and Written Opinion, International Application No. PCT/FI2012/050670, dated Dec. 10, 2012, Authorized officer Vesa-Matti Louekoski.
(Continued)

*Primary Examiner* — Steve Rowland
(74) *Attorney, Agent, or Firm* — Hoffmann & Baron, LLP

(57) ABSTRACT

System, apparatus, and computer program for team sport are disclosed. The system includes three parts: electronic tags attachable to players, a reader configured to read player identification data from the electronic tags, and an apparatus. The apparatus performs the following: obtains player data including the player identification data from the reader, the player data indicating whether the player carrying the electronic tag resides out of a playing field; obtains clock data from a clock; and creates personal player playing time data on the basis of the player data including the player identification data and the clock data, the personal player playing time data indicating the time the player resides in the playing field during the game.

17 Claims, 3 Drawing Sheets

(51) Int. Cl.
*G07C 1/28* (2006.01)
*G06Q 10/06* (2012.01)
*H04W 4/00* (2009.01)

(56) References Cited

U.S. PATENT DOCUMENTS

| | | |
|---|---|---|
| 2007/0135243 A1 | 6/2007 | LaRue et al. |
| 2009/0251298 A1 | 10/2009 | Dakers |
| 2010/0030350 A1* | 2/2010 | House ................ A63B 24/0021 700/91 |
| 2010/0134614 A1 | 6/2010 | Aman |
| 2010/0184564 A1* | 7/2010 | Molyneux ............ A43B 1/0054 482/1 |
| 2012/0072172 A1* | 3/2012 | Howell .................... G07C 1/24 702/178 |
| 2014/0236331 A1* | 8/2014 | Lehmann ........... G09B 19/0038 700/93 |

OTHER PUBLICATIONS

Search Report, Finnish Application No. 20115707, dated Apr. 25, 2012.
Supplementary European Search Report, Application No. EP 12 80 8086, dated Feb. 3, 2015.
Inquiry Under the Substantive Examination, Application No. 2013147085, Filing date Jun. 27, 2012, Applicant Kuru Digital Creations Oy, FI.

* cited by examiner

SYSTEM FOR COMPUTING PERSONAL PLAYING TIME IN A TEAM SPORT

CROSS-REFERENCE TO RELATED APPLICATION

This application is a National Stage application of International Application No. PCT/FI2012/050670, filed Jun. 27, 2012, which claims benefit to Finnish Application No. 20115707, filed Jul. 1, 2011, which are incorporated by reference herein in their entirety.

BACKGROUND

1. Field

The invention relates to a team sport system.

2. Description of the Related Art

Monitoring of players' playing time in team sport is still performed with relatively primitive tools, such as a manually operated stopwatch, pen, and paper. A number of people are needed for starting and stopping the stopwatches while the players enter and leave the playing field, and for writing down the playing times. Such manual processing is laborious and error prone. The playing times may be erroneous by several minutes per each game. Real-time tracking of playing time during the game is very difficult. Further sophistication is clearly desirable.

SUMMARY

According to an aspect of the present invention, there is provided a system comprising: electronic tags attachable to players of a team sport, each electronic tag comprising a memory capable of storing player identification data; at least one reader configured to read player identification data from the electronic tags; and an apparatus, coupled with the reader, comprising a processor, and a memory including computer program instructions, the memory and the computer program instructions are configured to, with the processor, cause the apparatus to perform at least the following: obtain player data including the player identification data from the reader, the player data indicating whether the player carrying the electronic tag resides out of a playing field; obtain clock data from a clock; and create personal player playing time data on the basis of the player data including the player identification data and the clock data, the personal player playing time data indicating the time the player resides in the playing field during the game.

According to another aspect of the present invention, there is provided an apparatus, couplable with at least one reader configured to read player identification data from electronic tags attachable to players of a team sport, each electronic tag comprising a memory capable of storing player identification data, the apparatus comprising a processor, and a memory including computer program instructions, the memory and the computer program instructions are configured to, with the processor, cause the apparatus to perform at least the following: obtain player data including the player identification data from the reader, the player data indicating whether the player carrying the electronic tag resides out of a playing field; obtain clock data from a clock; and create personal player playing time data on the basis of the player data including the player identification data and the clock data, the personal player playing time data indicating the time the player resides in the playing field during the game.

According to another aspect of the present invention, there is provided a non-transitory computer readable storage medium storing a computer program comprising computer program instructions which, when loaded into an apparatus, the apparatus being couplable with at least one reader configured to read player identification data from electronic tags attachable to players of a team sport, each electronic tag comprising a memory capable of storing player identification data, cause the apparatus to perform at least the following: obtain player data including the player identification data from the reader, the player data indicating whether the player carrying the electronic tag resides out of a playing field; obtain clock data from a clock; and create personal player playing time data on the basis of the player data including the player identification data and the clock data, the personal player playing time data indicating the time the player resides in the playing field during the game.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an" embodiment in several locations, this does not necessarily mean that each such reference is to the same embodiment(s), or that the feature only applies to a single embodiment. Single features of different embodiments may also be combined to provide other embodiments.

Figure 1:
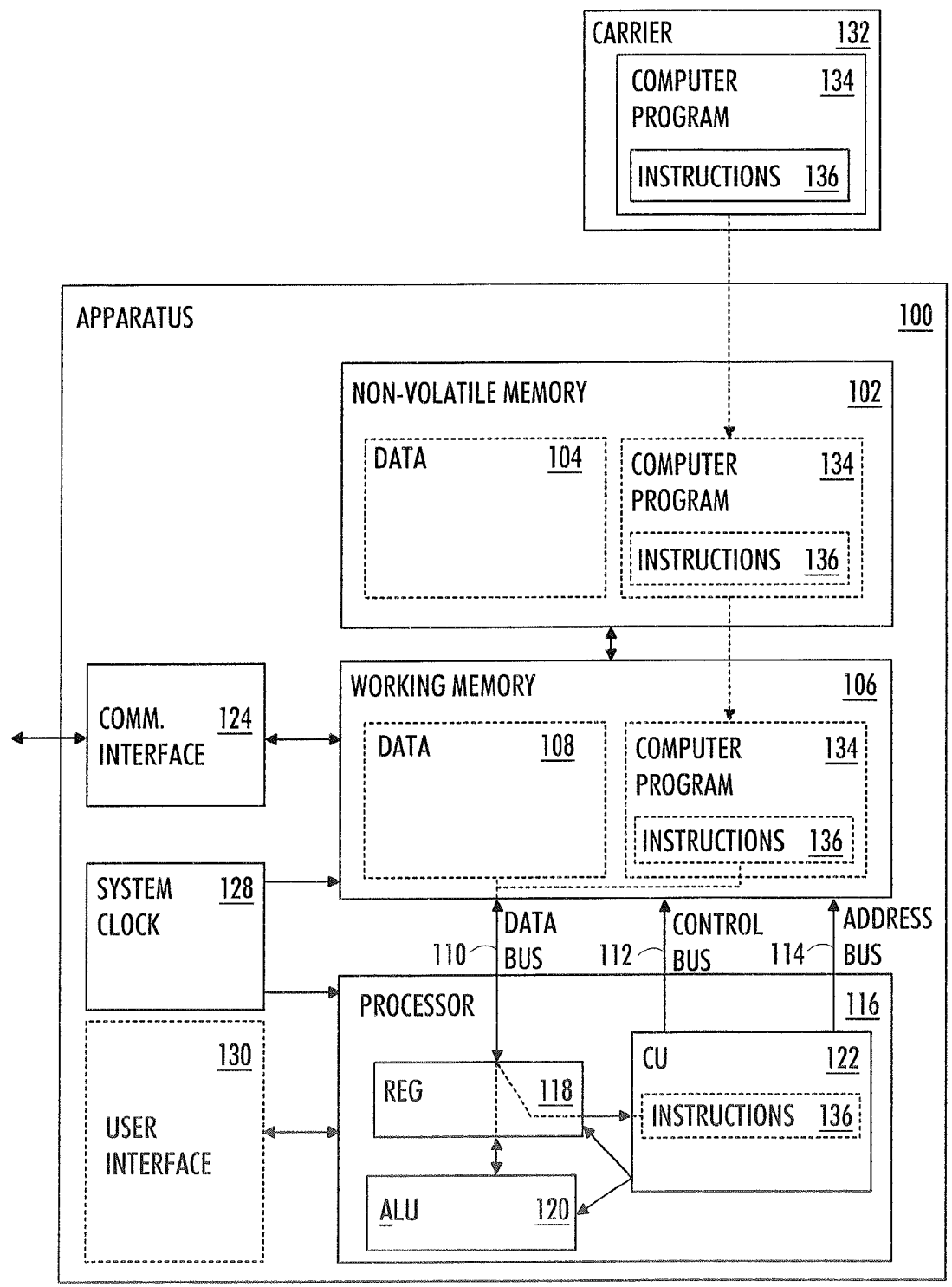
FIG. 1 illustrates embodiments of an apparatus.
Figure 2:
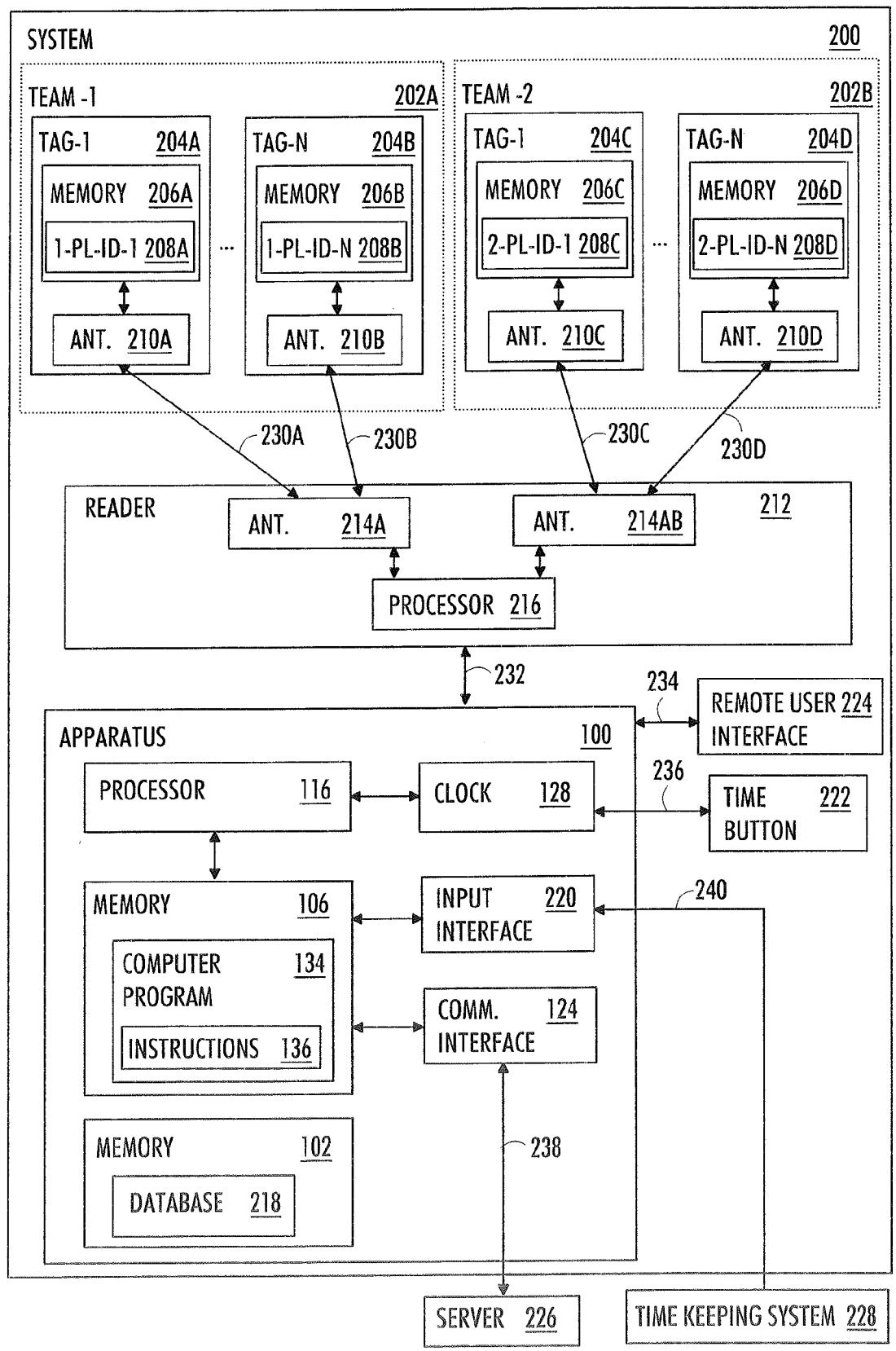
FIG. 2 illustrates embodiments of a system.
Figure 3:
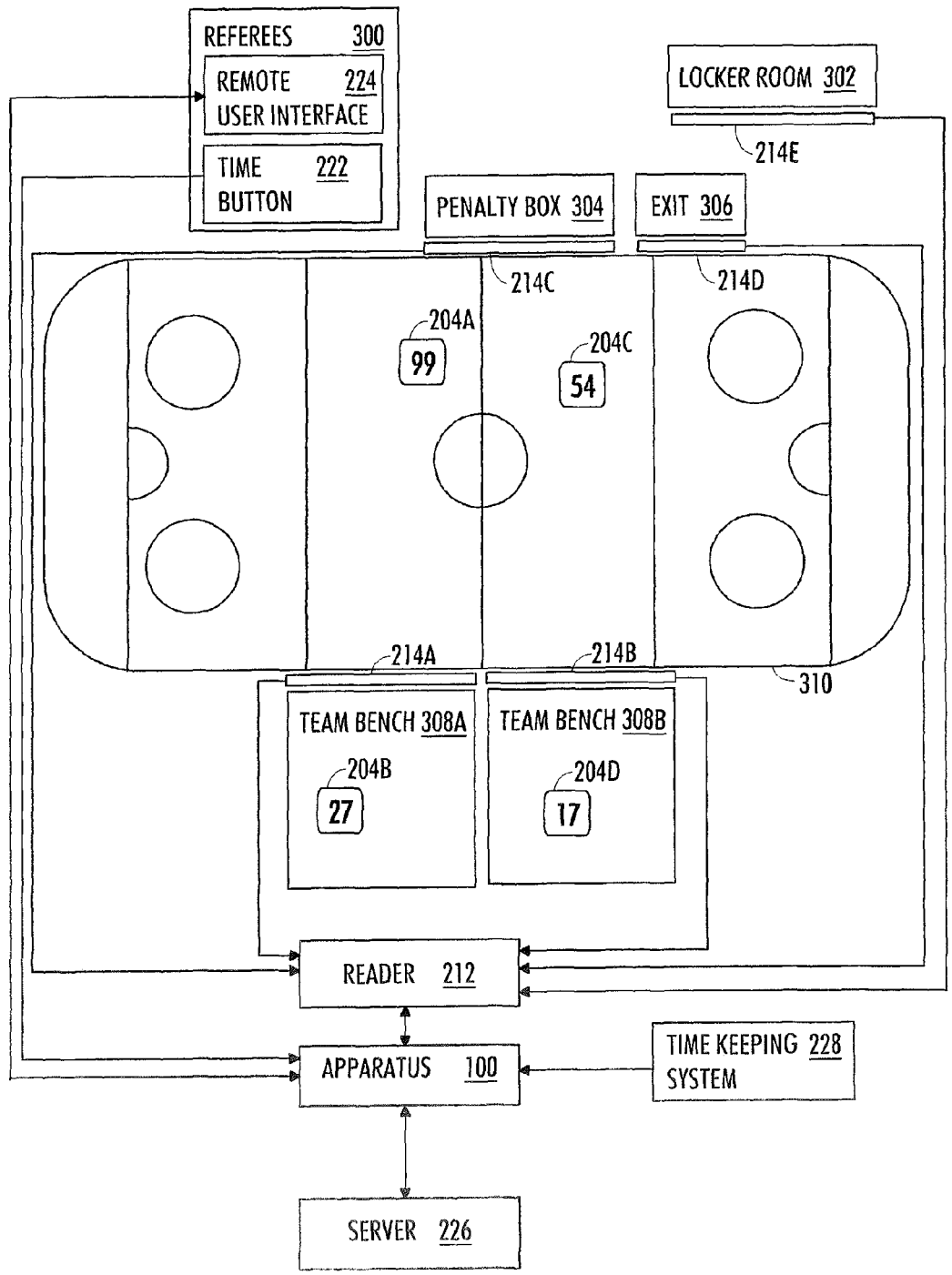
FIG. 3 illustrates embodiments of a system for ice hockey.

FIG. 1 illustrates embodiments of an apparatus 100, FIG. 2 illustrates embodiments of a system 200, and FIG. 3 illustrates the system 200 for ice hockey. FIGS. 1, 2, and 3 only show some elements whose implementation may differ from what is shown. The connections shown in FIGS. 1, 2, and 3 are logical connections; the actual physical connections may be different. Interfaces between the various elements may be implemented with suitable interface technologies, such as a message interface, a method interface, a sub-routine call interface, a block interface, or any means enabling communication between functional sub-units. It should be appreciated that the apparatus 100 may comprise other parts. However, such other parts may be irrelevant to the actual invention and, therefore, they need not be discussed in more detail here. It is also to be noted that although some elements are depicted as separate ones, some of them may be integrated into a single physical element. The specifications of the apparatus 100 and system 200 may develop rapidly. Such development may require extra changes to an embodiment. Therefore, all words and expressions should be interpreted broadly, and they are intended to illustrate, not to restrict, the embodiments.

As shown in FIG. 2, the system 200 comprises three parts: electronic tags 204A, 204B, 204C, 204D, a reader 212, and the apparatus 100.

The electronic tags 204A, 204B, 204C, 204D are attachable to players of a team sport. The electronic tags 204A, 204B, 204C, 204D may be attached onto the players themselves by suitable fasteners, or into the gear used by the players during the game such as the protective gear. In the example embodiment of FIG. 2, there are shown two teams:

team-1 202A, and team-2 202B. Each team has N players, wherein N is a positive integer greater than one. Consequently, in FIG. 2 team-1 202A has N tags, of which tag-1 204A and tag-N 204B are shown. Accordingly, team-2 202B has also N tags, of which tag-1 204C and tag-N 204D are shown. Naturally, the number of teams, and the number of players in each team may vary.

Theoretically, a 'team sport' includes any sport which involves players working together towards a shared objective. Usually, this shared objective is to win, by outscoring the opposing team. The team sport includes, but is not limited to, ice hockey, football (soccer), volleyball, basketball, floorball, and many others. The teams may be organized into a 'league', i.e. a group of sports teams that compete against each other in a specific team sport. One example of a league is the National Hockey League (NHL) in ice hockey.

The electronic tags 204A, 204B, 204C, 204D may be radio-frequency identification (RFID) tags. An RFID tag may be attached to an object for the purpose of identification and tracking. In RFID technology, data is transferred with radio waves between the reader 212 and the electronic tags 204A, 204B, 204C, 204D. Theoretically speaking, radio waves are a type of electromagnetic radiation with wavelengths in the electromagnetic spectrum longer than infrared light. The electromagnetic radiation has both electric and magnetic field components. Depending on the technology, either electric or magnetic component may dominate. Consequently, the embodiments are not restricted to RFID tags, but also other suitable wireless communication technologies may be utilized.

Each electronic tag 204A, 204B, 204C, 204D comprises a memory 206A, 206B, 206C, 206D capable of storing player identification data 208A, 208B, 208C, 208D. In the example embodiment of FIG. 2, team-1 202A has player identities 1-PL-ID-1 208A to 1-PL-ID-N 208B, and team-2 202B has player identities 2-PL-ID-1 208C to 2-PL-ID-N 208D. The player identification data 208A, 208B, 208C, 208D may be in any suitable format such as a numerical or alphanumerical code. The code may be unique so that each player has his own unique identifier. The unique identifier may be implemented so that a long enough code is used to ensure that each player has own unique identifier. Let us suppose that there are one million players worldwide within a specific team sport needing the identifiers. In such a case, twenty bits will ensure 1048576 different codes. Alternatively, each team may be given their own unique identifier, and within the team the players may then be identified by their player number, for example. In NHL, for example, the maximum number of players is 18 per team plus two goaltenders.

The memory 206A, 206B, 206C, 206D may be implemented by any suitable technology to implement a non-volatile memory, e.g. a memory which does not lose its contents even after it is powered off. The memory 206A, 206B, 206C, 206D may be implemented by a suitable integrated circuit, for example, such as EPROM (Erasable Programmable Read-Only-Memory).

The RFID tag may comprise at least two parts: an integrated circuit for storing and processing information, modulating and demodulating a RF signal, and other specialized functions, and an antenna 210A, 210B, 210C, 210D for receiving and transmitting the signal. RFID tag may be passive (using no battery), active (with a battery and always broadcasting its signal) or battery assisted passive (with a battery and activated by the presence of the reader 212).

The reader (a.k.a. interrogator) 212 is configured to read 230A, 230B, 230C, 230D the player identification data 208A, 208B, 208C, 208D from the electronic tags (a.k.a. label) 204A, 204B, 204C, 204D. The apparatus 100 is coupled 232 with the reader 212. Depending on mobility, RFID readers 212 may be classified into two different types: fixed and mobile. The fixed reader 212 reads the electronic tags 204A, 204B, 204C, 204D in a stationary position. The fixed reader 212 may set up a specific interrogation zone and create a bubble of RF energy that may be precisely controlled allowing a very definitive reading area. The mobile reader 212 may be placed in a suitable location as such a reader may be hand-held, for example. The reader 212 may comprise a processor 216, and at least one antenna 214A, 214B.

In an example embodiment, the reader 212 may be an Impinj Speedway Revolution UHF reader (IPJ-REV-R420 (ETSI)) utilizing circular polarized UHF antennas 214A, 214B and the electronic tags 204A, 204B, 204C, 204D may be Confidex UHF RFID tags.

The apparatus 100 comprises a processor 116, and a memory 102/106 including computer program 134 instructions 136. Consequently, the apparatus 100 may be implemented as a computer, or as any other electronic data processing device.

The apparatus 100 may be implemented as a personal computer with the following specification, for example: Asus EeeTop PC ET1602 with a touchscreen and a network interface card. The touchscreen is an electronic visual display capable of detecting the presence and location of a touch within the display area. The touchscreen, together with the software run in the processor 116 implements a user interface for the apparatus 100: the touchscreen enables the user to interact directly with what is displayed (as opposed to an indirect interaction with a cursor controlled by a mouse or another pointing device).

The memory 102/106 and the computer program 134 instructions 136 are configured to, with the processor 116, cause the apparatus 100 to perform the following: obtain player data including the player identification data from the reader 212. The player data indicates whether the player carrying the electronic tag 204A, 204B, 204C, 204D resides out of a playing field 310.

Additionally, the memory 102/106 and the computer program 134 instructions 136 are configured to, with the processor 116, cause the apparatus 100 to perform the following: obtain clock data from a clock 128/228.

Furthermore, the memory 102/106 and the computer program 134 instructions 136 are configured to, with the processor 116, cause the apparatus 100 to perform the following: create personal player playing time data on the basis of the player data including the player identification data and the clock data. The personal player playing time data indicates the time the player resides in the playing field 310 during the game. Especially in a team sport such as ice hockey where players may be exchanged in a rapid fashion, i.e. only a part of the players are in the playing field 310 in any given time, and the rest of the players are resting, the tracking of personal player playing time is a demanding task.

In an embodiment, illustrated in FIG. 3, the reader 212 further comprises at least one antenna 214A, 214B, 214C, 214E placed outside 308A, 308B, 304, 302 the playing field 310 and/or at least one antenna 214D placed by an exit 306 from the playing field 310. In the example embodiment of FIG. 3, our example team sport is ice hockey, and, consequently, the playing field 310 is an ice hockey rink. The antennas 214A, 214B, 214C, 214D may be attached to the outside surface of the wall forming the rink 310. As illustrated in FIG. 3, the antenna 214A, 214B may be placed by a team bench 308A, 308B of the team 202A, 202B. One to four such antennas may be needed to cover each team bench. The beam of the antenna 214A, 214B may be directed towards the team bench 202A, 202B. One simple way of achieving the directed antenna beam is by placing metal or other material obstructing the radio waves beside the antenna 214A, 214B. For example: a metal sheet may be placed between the antenna 214A, 214B and the wall of the rink 310 so that the antenna beam is directed towards the team bench 202A, 202B. Another possible location for the antenna 214C is by the penalty box 304. Furthermore, the antenna 214E may be placed in the locker room(s) 302.

The idea here is that the antenna 214A, 214B, 214C, 214D, 214E is not placed in the playing field 310 or to detect the presence of the electronic tags 204A, 204C in the playing field 310, but the antenna 214A, 214B, 214C, 214D, 214E is placed in such a manner that the presence of the electronic tags 204B, 204D out of the playing field 310 is detected. As shown in FIG. 3, it is not detected that the electronic tags 204A, 204C are in the playing field 310, but it is detected that the electronic tags 204B, 204D are out of the playing field 310. Consequently, in an embodiment, the memory 106 and the computer program 134 instructions 136 are further configured to, with the processor 116, cause the apparatus 100 to perform the following: create the personal player playing time data by subtracting the time the player resided out of the playing field 310 during the game from a total time of the game. The player data may further indicate whether the player carrying the electronic tag 204A, 204B, 204C, 204D resides on a team bench 308A, 308B during the game, in a penalty box 304 during the game, and/or in a locker room 302 during the game.

In principle, the antenna 214A could be directed towards the playing field 310, but in such a case the antenna beam must be very precise so that only the electronic tags 204A, 204C, residing in the playing field 310 are detected, but such tags 204B, 204D that reside outside the playing field 310 are not detected. One way of achieving this may be by placing an antenna 214A strip around the rink 310, and placing material obstructing the radio waves between the antenna 214 strip and the places where the players reside when they are out of the rink 310 so that the antenna beam is directed towards the centre of the rink 310 but not away from the rink 310. In this case, the presence of the players in the rink 310 is detected, and not the absence of the players from the rink 310.

The apparatus 100 may be an electronic digital computer, which may comprise, besides the processor 116, a number of other devices. The memory may comprise a working memory 106 and a non-volatile memory 102. Additionally, the computer 100 comprises a system clock 128. Furthermore, the computer 100 may comprise a number of peripheral devices. In FIG. 1, two peripheral devices are illustrated: a communications interface 124 and a user interface 130. Naturally, the computer 100 may comprise a number of other peripheral devices, not illustrated here for the sake of clarity.

The system clock 128 constantly generates a stream of electrical pulses, which cause the various transferring operations within the computer 100 to take place in an orderly manner and with specific timing.

The communication interface 124 may implement a wired/wireless telecommunications connection between the apparatus 100 and some other device. A wireless connection may be implemented with a wireless transceiver operating according to the GSM (Global System for Mobile Communications), WCDMA (Wideband Code Division Multiple Access), WLAN (Wireless Local Area Network) or Bluetooth® standard, or any other suitable standard/non-standard/proprietary wireless communication means. The wireless connection may also be implemented by a wireless connection to an access point, wherefrom the data may be transferred onwards by a wired connection, through the Internet, for example. A wired connection may be implemented by an Ethernet cable, for example, or other means of implementing a local area network (LAN). The communication interface 124 may also comprise a suitable communication bus, such as USB (Universal Serial Bus) or some other serial/parallel bus, operating in a wireless/wired fashion, with which the apparatus 100 may be coupled to an external display or a printer, for example.

Additionally, the apparatus 100 may communicate with other devices through its memory, i.e. the data 104 may have been brought into the non-volatile memory 102 via a memory device (such as a memory card, an optical disk, or any other suitable non-volatile memory device).

The term 'processor' refers to a device that is capable of processing data. Depending on the processing power needed, the computer 100 may comprise several (parallel) processors 116. The processor 116 may comprise an electronic circuit or electronic circuits implementing the required functionality, and/or a microprocessor or microprocessors running a computer program 134 implementing the required functionality. When designing the implementation, a person skilled in the art will consider the requirements set for the size and power consumption of the apparatus 100, the necessary processing capacity, production costs, and production volumes, for example. The electronic circuit may comprise logic components, standard integrated circuits, application-specific integrated circuits (ASIC), and/or other suitable electronic structures.

The microprocessor 116 implements functions of a central processing unit (CPU) on an integrated circuit. The CPU 116 is a logic machine executing a computer program 134, which comprises program instructions 136. The program instructions 136 may be coded as a computer program using a programming language, which may be a high-level programming language, such as C, C++, or Java, or a low-level programming language, such as a machine language, or an assembler. The CPU 116 may comprise a set of registers 118, an arithmetic logic unit (ALU) 120, and a control unit (CU) 122. The control unit 122 is controlled by a sequence of program instructions 136 transferred to the CPU 116 from the working memory 106. The control unit 122 may contain a number of microinstructions for basic operations. The implementation of the microinstructions may vary, depending on the CPU 116 design. The microprocessor 116 may also have an operating system (a general purpose operating system, a dedicated operating system of an embedded system, or a real-time operating system, for example), which may provide the computer program 134 with system services. The operating system may be Windows, or Linux, for example.

There may be three different types of buses between the working memory 106 and the processor 116: a data bus 110, a control bus 112, and an address bus 114. The control unit 122 uses the control bus 112 to set the working memory 106 in two states, one for writing data into the working memory 106, and the other for reading data from the working memory 106. The control unit 122 uses the address bus 114 to send to the working memory 106 address signals for addressing specified portions of the memory in writing and reading states. The data bus 110 is used to transfer data 108 from the working memory 106 to the processor 116 and from the processor 116 to the working memory 106, and to transfer the instructions 136 from the working memory 106 to the processor 116.

The working memory 106 may be implemented as a random-access memory (RAM), where the information is lost after the power is switched off. The RAM is capable of returning any piece of data in a constant time, regardless of its physical location and whether or not it is related to the previous piece of data. The data may comprise data relating to the team sport, any temporary data needed during the processing, program instructions etc.

The non-volatile memory 102 retains the stored information even when not powered. Examples of non-volatile memory include read-only memory (ROM), flash memory, magnetic computer storage devices such as hard disk drives, and optical discs. As is shown in FIG. 1, the non-volatile memory 102 may store both data 104 and a computer program 134 comprising program instructions 136. Furthermore, as shown in FIG. 2, the non-volatile memory 102 may store a database 218, an SQL (Structured Query Language) database, for example, which may hold the information relating to the team(s), players, playing time etc.

An embodiment provides a computer program 134 comprising the computer program instructions 136 which, when loaded into the apparatus 100, cause the apparatus 100 to perform the described operations of the various embodiments. Another embodiment provides a non-transitory computer readable storage medium 132 storing a computer program 134, comprising program instructions which, when loaded into an apparatus 100, cause the apparatus 100 to perform the described operations of the various embodiments.

The computer program 134 may be in source code form, object code form, or in some intermediate form. The computer program 134 may be stored in a carrier 132, which may be any entity or device capable of carrying the program to the apparatus 100. The carrier 132 may be implemented as follows, for example: the computer program 134 may be embodied on a record medium, stored in a computer memory, embodied in a read-only memory, carried on an electrical carrier signal, carried on a telecommunications signal, and/or embodied on a software distribution medium. In some jurisdictions, depending on the legislation and the patent practice, the carrier 132 may not be the telecommunications signal.

FIG. 1 illustrates that the carrier 132 may be coupled with the apparatus 100, whereupon the program 134 comprising the program instructions 136 is transferred into the non-volatile memory 102 of the apparatus 100. The program 134 with its program instructions 136 may be loaded from the non-volatile memory 102 into the working memory 106. During running of the program 134, the program instructions 136 are transferred via the data bus 110 from the working memory 106 into the control unit 122, wherein usually a portion of the instructions 136 resides and controls the operation of the apparatus 100.

There are many ways to structure the program 134. The operations of the program may be divided into functional modules, sub-routines, methods, classes, objects, applets, macros, widgets etc., depending on the software design methodology and the programming language used. In modern programming environments, there are software libraries, i.e. compilations of ready-made functions, which may be utilized by the program for performing a wide variety of standard operations.

In summary, the apparatus 100 illustrated in FIG. 1 may be used as a part of the system 200 illustrated in FIGS. 2 and 3. The apparatus 100 may be a single stand-alone apparatus 100. But, this is just one option, as, depending on the team sport, on the requirements set by the nature of the teams sport, and on other decisive factors, the apparatus 100 functionality may be distributed or duplicated among a number of apparatuses or distributed parts implementing the required structure and functionality.

Besides the electronic tags 204A, 204B, 204C, 204D, the reader 212, and the apparatus 100, the system 200 may comprise a number of other parts, and the system 200 may also interact with out-of-the-system parts. FIGS. 2 and 3 illustrate some such parts. The communication between the shown parts may be implemented by suitable wireless/wired communication technologies, including, but not being limited to, WLAN, Bluetooth and Ethernet, for example.

The clock data may be maintained by the apparatus 100 itself with the (system) clock 128 or it may be obtained from a time keeping system 228 of the game organizer.

In an embodiment, the apparatus 100 further comprises an input interface 220 configured to receive 240 timekeeping data relating to the game from an electronic time keeping system 228. The memory 102/106 and the computer program 134 instructions 136 are configured to, with the processor 116, cause the apparatus 100 to perform the following: obtain such clock data from the electronic time keeping system 228 which indicates time keeping of the game, and create such personal player playing time data which indicates the time the player resided in the playing field during the game while the time ran in the time keeping 228.

In another embodiment, the system 200 further comprises a time button 222 operable by a human operator. The memory 102/106 and the computer program 134 instructions 136 are configured to, with the processor 116, cause the apparatus 100 to perform the following: implement time keeping of the game on the basis of the clock data and the time button data received 236 from the time button 222, and create such personal player playing time data which indicates the time the player resided in the playing field 310 during the game while the time ran in the time keeping.

In an embodiment, the system 200 further comprises a user interface 130, 224. As illustrated in FIGS. 2 and 3, the user interface may be either implemented in the apparatus 100 as an internal user interface 130, and/or implemented in another apparatus as a remote user interface 224. In practice, the internal user interface 130 may be a part of the normal user interface of the computer, including keyboard, mouse, display, touch pad, touch screen, and/or other such physical user interface elements, and also the software implementing the user interaction and appropriate program components such as windows, menus, buttons, and the like. However, in some cases, the apparatus 100 may not necessarily have the internal user interface 130 at all. In practice, the remote user interface 224 may be implemented by a computer such as a laptop computer, a tablet computer, a pad computer, or a smartphone with appropriate aforementioned physical user interface elements and the user interface software. In practice, the remote user interface 224 thus communicates 234 with the apparatus 100. The memory 102/106 and the computer program 134 instructions 136 are configured to, with the processor 116, cause the apparatus 100 to perform the following: output the personal player playing time data with the user interface 130/224.

In an embodiment, the apparatus 100 further comprises a communications interface 124 configured to exchange 238 information with another apparatus 224 and/or a server 226 configured to store information of the game of the team sport. The memory 102/106 and the computer program 134 instructions 136 are configured to, with the processor 116, cause the apparatus 100 to perform the following: exchange the personal player playing time data with the other apparatus 224 and/or the server 226 through the communications interface 124.

The system 200 may also communicate suitable public information to a big wide-audience display viewed by the spectators of the team sport event. Such public information may be, for example, game statistics including personal player playing time of an individual player, for example. Besides the basic set, the system 200 may comprise other parts. One stand-alone apparatus 224 may be operated by a supervisor, which may be an official of the league observing the game, for example. The apparatus 224 of the supervisor may communicate with a server of the league storing information gathered from individual games and teams. As shown in FIG. 3, the remote user interface 224 and the time button 222 may be located by the referees 300 during the game.

The system may also comprise a service provider server 226, which stores and processes various data. In such an embodiment, a service provider may provide the system 200 for all individual teams within a league for the collection of the statistics. The system 200 may also comprise an interface for media companies, i.e. information collected from games may be, even in real-time, provided for television broadcasting companies, Internet sites etc. so that the media companies may provide further information on games and teams for their viewers/users. Such an interface may be implemented by a web browser software contacting the server 226 over the Internet.

Naturally, the system 200 may include numerous other functionalities, not described within this patent application for the sake of clarity and conciseness. Such functionalities include creation of teams with player identification data, input of other data relating to teams, input of other data relating to players, input of data relating to individual games, and all kinds of reports and summaries of the inputted data.

It will be obvious to a person skilled in the art that, as technology advances, the inventive concept can be implemented in various ways. The invention and its embodiments are not limited to the examples described above but may vary within the scope of the claims.

The invention claimed is:

1. A system comprising:
electronic tags attachable to players of a team sport, each electronic tag comprising a memory capable of storing player identification data;
at least one reader configured to read player identification data from the electronic tags; and
an apparatus, coupled with the reader, comprising a processor, and a memory including computer program instructions, the memory and the computer program instructions are configured to, with the processor, cause the apparatus to perform operations comprising:
obtaining player data including the player identification data from the reader, the player data indicating whether the player carrying the electronic tag resides out of a playing field;
obtaining clock data from a clock;
creating personal player playing time data on the basis of the player data including the player identification data and the clock data, the personal player playing time data indicating the time the player resides in the playing field during a game; and
creating the personal player playing time data by subtracting the time the player resided out of the playing field during the game from a total time of the game.

2. The system of claim 1, wherein the electronic tags are radio-frequency identification tags.

3. The system of claim 1, wherein the reader further comprises at least one antenna placed outside the playing field and/or at least one antenna placed by an exit from the playing field.

4. The system of claim 1, wherein the player data further indicates whether the player carrying the electronic tag resides on a team bench during the game, in a penalty box during the game, and/or in a locker room during the game.

5. The system of claim 1, wherein the apparatus further comprises an input interface configured to receive timekeeping data relating to the game from an electronic time keeping system, and wherein the memory and the computer program instructions are further configured to, with the processor, cause the apparatus to perform operations comprising:
obtaining such clock data from the electronic time keeping system which indicates time keeping of the game; and
creating such personal player playing time data which indicates the time the player resided in the playing field during the game while the time ran in the time keeping.

6. The system of claim 1, further comprising a time button operable by a human operator, wherein the memory and the computer program instructions are further configured to, with the processor, cause the apparatus to perform operations comprising:
implementing time keeping of the game on the basis of the clock data and the time button data received from the time button; and
creating such personal player playing time data which indicates the time the player resided in the playing field during the game while the time ran in the time keeping.

7. The system of claim 1, wherein the system further comprises a user interface, and wherein the memory and the computer program instructions are further configured to, with the processor, cause the apparatus to perform operations comprising:
outputting the personal player playing time data with the user interface.

8. The system of claim 1, wherein the apparatus further comprises a communications interface configured to exchange information with another apparatus and/or a server configured to store information of the game of the team sport, and the memory and the computer program instructions are further configured to, with the processor, cause the apparatus to perform operations comprising:
exchanging the personal player playing time data with the other apparatus and/or the server through the communications interface.

9. An apparatus, couplable with at least one reader configured to read player identification data from electronic tags attachable to players of a team sport, each electronic tag comprising a memory capable of storing player identification data, the apparatus comprising a processor, and a memory including computer program instructions, the memory and the computer program instructions are configured to, with the processor, cause the apparatus to perform operations comprising:

obtaining player data including the player identification data from the reader, the player data indicating whether the player carrying the electronic tag resides out of a playing field;

obtaining clock data from a clock;

creating personal player playing time data on the basis of the player data including the player identification data and the clock data, the personal player playing time data indicating the time the player resides in the playing field during a game; and creating the personal player playing time data by subtracting the time the player resided out of the playing field during the game from a total time of the game.

10. The apparatus of claim 9, wherein the electronic tags are radio-frequency identification tags.

11. The apparatus of claim 9, wherein the reader further comprises at least one antenna placed outside the playing field and/or at least one antenna placed by an exit from the playing field.

12. The apparatus of claim 9, wherein the player data further indicates whether the player carrying the electronic tag resides on a team bench during the game, in a penalty box during the game, and/or in a locker room during the game.

13. The apparatus of claim 9, wherein the apparatus further comprises an input interface configured to receive timekeeping data relating to the game from an electronic time keeping system, and wherein the memory and the computer program instructions are further configured to, with the processor, cause the apparatus to perform operations comprising:

obtaining such clock data from the electronic time keeping system which indicates time keeping of the game; and creating such personal player playing time data which indicates the time the player resided in the playing field during the game while the time ran in the time keeping.

14. The apparatus of claim 9, further comprising a time button operable by a human operator, wherein the memory and the computer program instructions are further configured to, with the processor, cause the apparatus to perform operations comprising:

implementing time keeping of the game on the basis of the clock data and the time button data received from the time button; and creating such personal player playing time data which indicates the time the player resided in the playing field during the game while the time ran in the time keeping.

15. The apparatus of claim 9, wherein the apparatus further comprises a user interface, and wherein the memory and the computer program instructions are further configured to, with the processor, cause the apparatus to perform operations comprising:

outputting the personal player playing time data with the user interface.

16. The apparatus of claim 9, wherein the apparatus further comprises a communications interface configured to exchange information with another apparatus and/or a server configured to store information of the game of the team sport, and the memory and the computer program instructions are further configured to, with the processor, cause the apparatus to perform operations comprising:

exchanging the personal player playing time data with the other apparatus and/or the server through the communications interface.

17. A non-transitory computer readable storage medium storing a computer program comprising computer program instructions which, when executed by an apparatus, the apparatus being couplable with at least one reader configured to read player identification data from electronic tags attachable to players of a team sport, each electronic tag comprising a memory capable of storing player identification data, cause the apparatus to perform operations comprising:

obtaining player data including the player identification data from the reader, the player data indicating whether the player carrying the electronic tag resides out of a playing field;

obtaining clock data from a clock;

creating personal player playing time data on the basis of the player data including the player identification data and the clock data, the personal player playing time data indicating the time the player resides in the playing field during a game; and creating the personal player playing time data by subtracting the time the player resided out of the playing field during the game from a total time of the game.

* * * * *